United States Patent [19]
Shulenberger

[11] Patent Number: 5,459,945
[45] Date of Patent: Oct. 24, 1995

[54] HEAT RECAPTURING, VACUUM ASSISTED EVAPORATIVE DRIER

[76] Inventor: Arthur Shulenberger, 282 San Benito Rd., Brisbane, Calif. 94005

[21] Appl. No.: 285,266

[22] Filed: Aug. 3, 1994

[51] Int. Cl.[6] .................................................. F26B 11/02
[52] U.S. Cl. ............................. 34/605; 34/77; 34/470
[58] Field of Search ............................. 34/513, 514, 515, 34/86, 469, 407, 408, 418, 470, 76, 77, 601, 604, 605, 606

[56] References Cited

U.S. PATENT DOCUMENTS

| | | | |
|---|---|---|---|
| 3,027,653 | 5/1958 | Long et al. | 34/605 |
| 4,811,495 | 3/1989 | Huang et al. | 34/605 |
| 5,131,169 | 7/1992 | Jaster | 34/15 |
| 5,228,209 | 7/1993 | Brunner | 34/77 |

FOREIGN PATENT DOCUMENTS 8430168  7/1985  United Kingdom ..................... 34/266

Primary Examiner—Denise L. Gromada
Assistant Examiner—Susanne C. Tinker
Attorney, Agent, or Firm—Douglas A. Chaikin; Robert Buckley

[57] ABSTRACT

A vacuum assisted system for drying articles of clothing with recaptured heat includes an evaporation chamber and a condensation chamber. The evaporation chamber is enclosed inside the condensation chamber. Heat transfers from the condensation chamber to the evaporation chamber when vapor condenses on the exterior of the evaporation chamber. Pressure is reduced in each chamber by an automated regulation system which pumps vapor from between the chambers to optimize drying.

9 Claims, 5 Drawing Sheets

HEAT RECAPTURING, VACUUM ASSISTED EVAPORATIVE DRIER

BACKGROUND OF THE INVENTION

1. Field of the Invention

This invention relates to vacuum assisted evaporative drying systems, and more specifically to clothing drying systems using latent heat recovery to improve energy efficiency.

2. Previous Art

Systems used for drying articles, such as the typical home clothes drier, use large amounts of energy. Most home dryers tumble damp clothing in a tumbler. The dryer also heats air and continually pumps hot air, at atmospheric pressure, through the damp clothing. The clothing dries. The hot air continually exhausts from the drier into the atmosphere. The exhausted heat is not recovered. Energy is wasted.

A number of attempts to conserve energy by reducing the drying time have been made. For example, some dryers rely on reduced pressures to dry clothing. See for example U.S. Pat. Nos. 4,615,125, 4,250,628, 4,057,628, 3,308,553, 3,229,382 and 3,030,712. At reduced pressure, energy is saved in two ways. Firstly, heating air at reduced pressures requires less energy. Secondly, evaporation occurs more rapidly at reduced pressures. With reduced pressures, the drying cycle shortens and energy is used for a shorter period of time. Also, at the lower temperature and shorter cycle, the clothing is subjected to less wear and less heat induced damage.

Various dryers recapture heat. U.S. Pat. No. 4,447,965 to Bray, teaches recirculation of heated air through the dryer. A compressor and electrical heating element raise the temperature of the recirculated air. Latent heat is recovered at a heat pump condenser via drying fluid which enters the drying chamber.

U.S. Pat. No. 5,13 1,169 to Jaster teaches how to move heated air through a tumbler operated at a sub-atmospheric pressure. Air is exhausted. The exhausted air passes through a heat exchanger so that heat is recaptured. The amount of energy needed to dry clothing is reduced. Jaster does not teach the use of a condensation chamber.

What is needed is a drier which more efficiently dries clothing by combining the advantages of reduced pressure with the advantages heat recapturing.

SUMMARY AND OBJECTS OF THE INVENTION

The following objects, features and advantages are illustrative to enhance a reader's understanding. The scope of the present invention is limited only by the appended claims.

It is an object to combine vacuum assistance with heat recapturing to reduce drying time and increase energy efficiency.

It is another object to provide a dryer which extracts vapor pressure at sub atmospheric pressure from an evaporation chamber and relies on a condensation chamber to condense the extracted vapor on the outer surface of the evaporation chamber and thereby transfer heat through the walls of the evaporation chamber.

In accordance with the above objects and those that will be mentioned and will become apparent below, the drier comprises:

an evaporation chamber having an interior and exterior, the interior is pressure sealed; and a condensation chamber and a vacuum line, the condensation chamber is pressure sealed, the vacuum line connects the condensation chamber in fluid communication with the evaporation chamber; and a pump attached in fluid communication with the vacuum line, the pump regulates pressure in the evaporation chamber and in the condensation chamber respectively, wherein the pump draws vapor from the evaporation chamber into the condensation chamber, the vapor condenses in the condensation chamber and heat conducts from the condensation chamber to the evaporation chamber.

In a preferred embodiment of the present invention, a portion of the exterior of the evaporation chamber defines a portion of the condensation chamber. Heat is conducted from the condensation chamber to the evaporation chamber through the exterior of the evaporation chamber.

In another preferred embodiment vapor, such as water vapor or other solvent vapor, is drawn from the evaporation chamber into the condensation chamber and condenses in the condensation chamber on the exterior of the evaporation chamber.

In another preferred embodiment, the evaporation chamber rotates. The condensed vapor drops from the exterior of the evaporation chamber and allows for continued condensation of vapor on the exterior of the evaporation chamber.

In another preferred embodiment, a heater heats the evaporation chamber to a first desired temperature to hasten drying of the articles. A second heater heats the condensation chamber to a second desired temperature to increase the rate of heat transfer to the exterior of the evaporation chamber from the condensation chamber.

In another preferred embodiment, the dryer includes a sensor system and a control system and the pump includes a vacuum line. The vacuum line interconnects the evaporation chamber, the pump and the condensation chamber in series. The sensor system monitors pressures and temperatures in the evaporation chamber and the condensation chamber respectively. The control system electronically attaches with the sensor system and the pump to regulate pressure in the evaporation chamber and in the condensation chamber.

In yet another preferred embodiment, the dryer includes an exhaust port and an air flow sensor attached thereto to sense when the air has been effectively purged from both the evaporation chamber and the condensation chamber.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
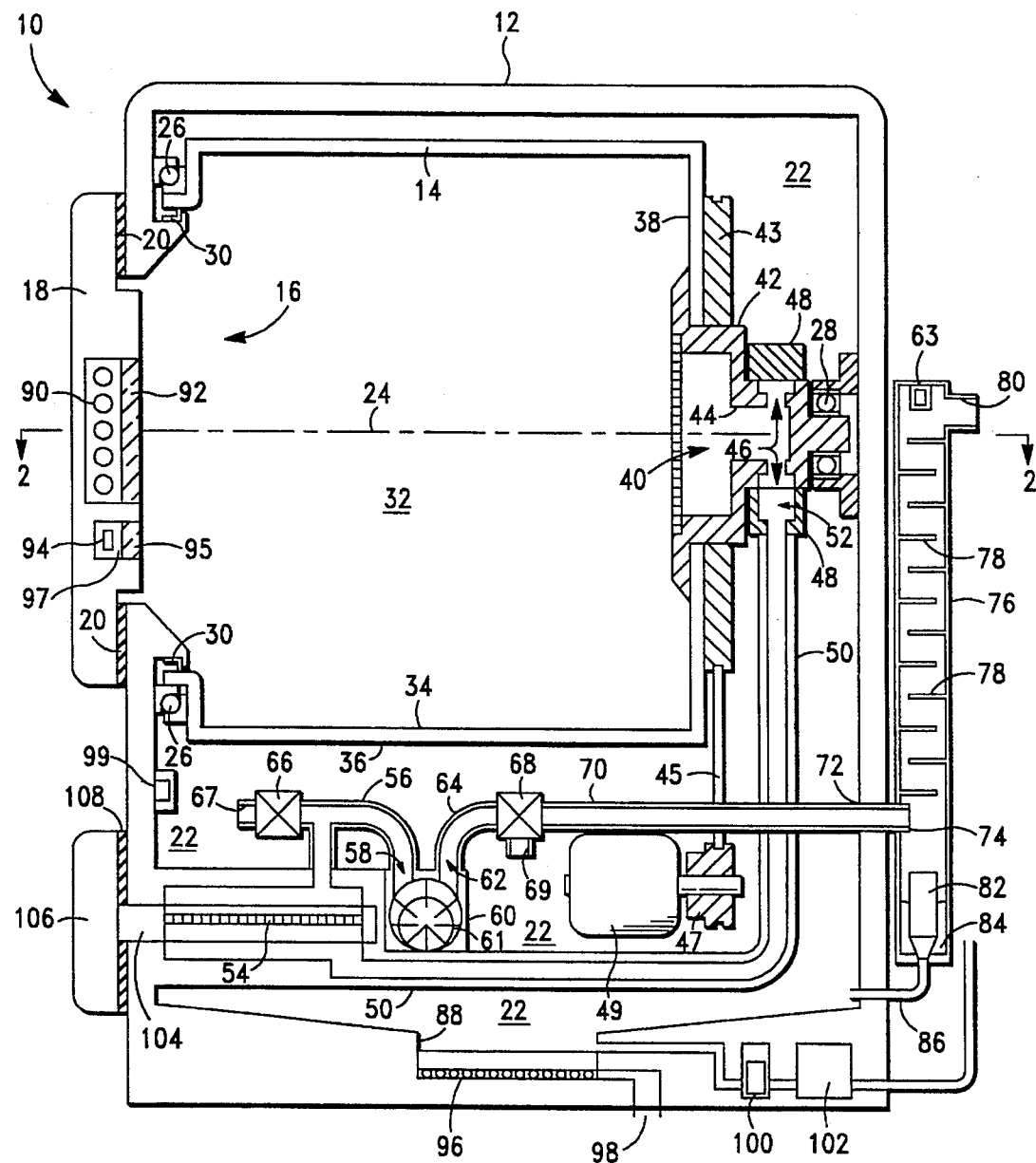
FIG. 1 is a cross-sectional view of a drier according to the present invention.
Figure 2:
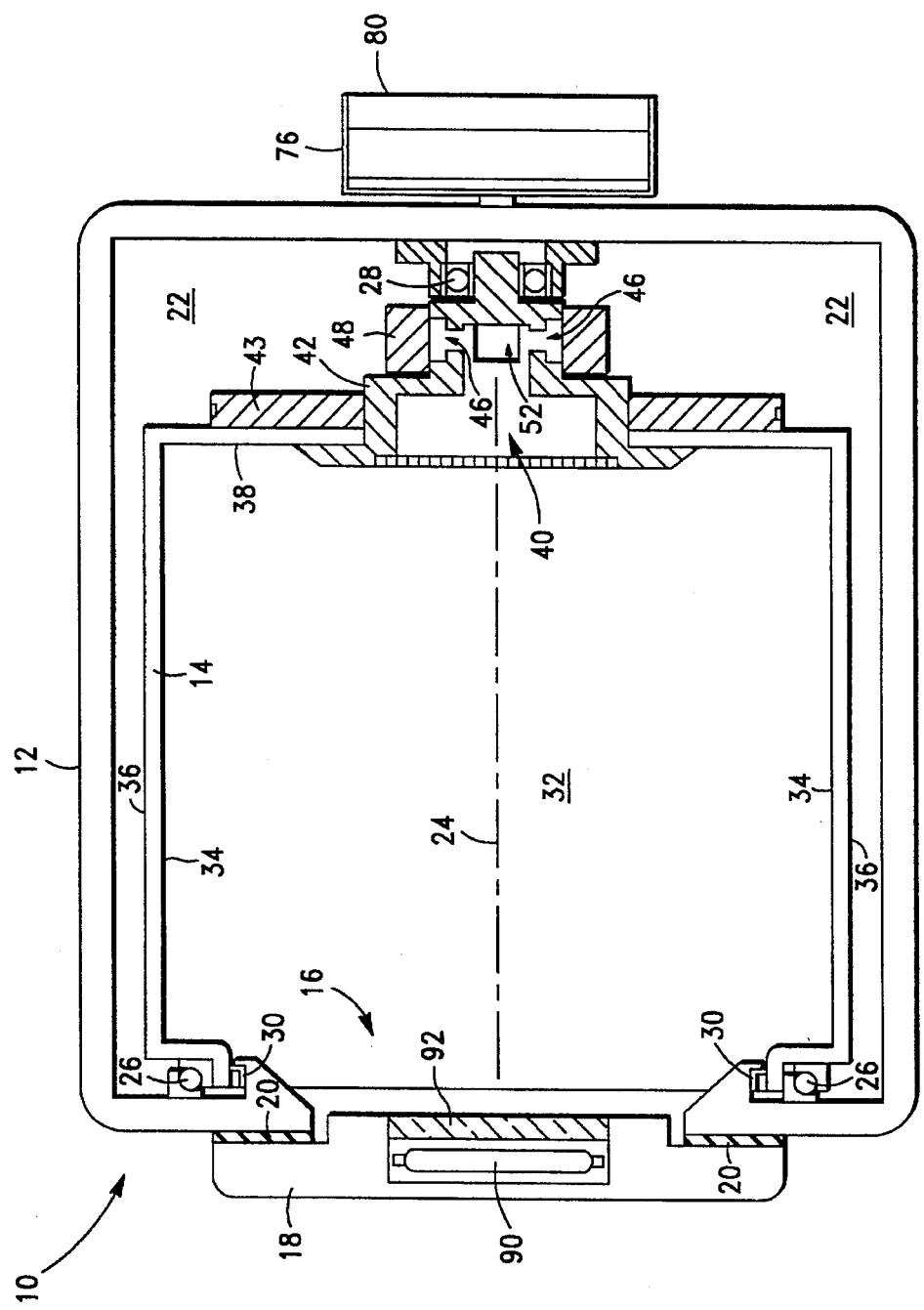
FIG. 2 is a cross-sectional top view through the line 2—2 of the drier illustrated in FIG. 1, looking in the direction of the arrows.

With reference to FIG. 1 and FIG. 2, there is shown a side cross-sectional view of an article drier according to the present invention. The article dryer is denoted generally by the numeral 10. The article drier 10 includes an enclosure 12, a tumbler 14 which defines an evaporation chamber 32, an access opening 16, an access door 18, a condensation chamber 22, a drive motor 49, a regulator system 61 including a pump 60 and a vacuum tube 50, an intake valves 66 and a bypass valve 68, and a water vapor trap 76. The terms tumbler 14 and evaporation chamber 32 are used interchangeably. FIG. 1 is a cross-sectional view of the article drier 10 of the present invention. FIG. 2 is a cross-sectional top view of the article drier 10 of FIG. 1 as seen from the line 2—2 in FIG. 1.

The enclosure 12 has sides, a top, a bottom and is pressure sealed. An opening 16 at the front of the enclosure 12 access the interior of the tumbler 14. The tumbler 14 defines the evaporation chamber 32. A seal 20 surrounds the opening 16. A hinged access door 18 attaches with the enclosure 12. The access door 18 closes against the seal 20 and seals the access opening 16.

The tumbler 14 mounts inside the enclosure 12 coaxial with the axis 24. A front bearing 26 supports the front of the tumbler 14. A rear bearing 28 supports the rear of the tumbler 14. The tumbler 14 rotates on the bearings 26 and 28 about the axis 24. A seal 30 surrounds the access opening 16 and seals the tumbler 14 against the enclosure 12.

The cylindrical walls of the tumbler 14 conduct heat. The tumbler 14 (the evaporation chamber 32) includes an inner surface 34 and an outer surface 36. During operation, articles to be dried are placed inside the evaporation chamber 32 and contact with the inner surface 34 of the evaporation chamber 32. Heat conducts from the inner surface 34 to the articles to be dried which contact the inner surface 34. Rotation of the tumbler 14 improves the contact and increases the heat transfer between the articles to be dried and the inner surface 34. Moisture in the heated articles evaporates and forms a vapor. Vapor flows from the evaporation chamber 32 through the vacuum tube 50 into the condensation chamber 22. The outer surface 36 of the evaporation chamber defines a portion of the condensation chamber 32. Vapor passed into the condensation chamber 32 condenses on the outer surface 36 of the evaporation chamber.

The process of changing moisture from a liquid to a vapor absorbs heat. This process is called evaporation. For example, when sweat evaporates from the body of an athlete, the sweat changes from a liquid to a vapor. The vapor absorbs heat from athlete. The athlete is cooled.

Oppositely, the process of changing moisture from a vapor to a liquid gives off heat. This process is condensation. The present invention employs a cycle of evaporation in the evaporation chamber 32 and a cycle of condensation in the condensation chamber 22.

Moisture evaporates from damp articles in the evaporation chamber and forms a vapor. The evaporation process takes heat from the damp articles. The vapor moves through the vacuum tube 50 into the condensation chamber. In the condensation chamber, the vapor condenses. Heat is given off. Because the outer surface of the evaporation chamber 32 defines a portion of the condensation chamber 22, the heat is given off on the outer surface 36 of the evaporation chamber. Accordingly, the outer surface of the evaporation chamber 32 is warmed by the condensation process. Warmth (heat) passes on to the inner surface 34 of the evaporation chamber 32. Articles contact the inner surface 34 and are heated and further dried. This process recycles until the articles are dried to a desired degree. Accordingly, heat is "recaptured". Recaptured heat sustains the evaporative drying process and promotes dryer efficiency.

The cylindrical tumbler 14 includes a closed back 38 having an opening generally indicated by the numeral 40 for use in pumping air and moisture out from the evaporation chamber 32. A hub 42 attaches to the closed back 38 of the evaporation chamber 32. The hub 42 is concentric with the axis 24. The hub 42 engages the rear bearing 28 rotates with the evaporation chamber 32 about the axis 24.

A pulley 43 attaches with the hub 42 with the closed back 38 of the tumbler 14. The pulley 43 engages a drive belt 45. The drive belt couples with a small drive pulley 47. A motor 49 attaches to rotate the small drive pulley 47. The tumbler 14 rotates about the axis 24 when the motor is on.

The hub 42 includes a hollow central portion 44 having multiple exhaust ports generally indicated by the numeral 46. The exhaust ports 46 extend radially from the opening 40 and through the hub 42. A collar 48 seals the hub 42 and couples the exhaust ports 46 with the vacuum line 50. When the evaporation chamber 32 rotates about the axis 24, the exhaust ports 46 alternately couple with the vacuum line 50 through an inlet 52. The inlet 52 forms integral with the collar 48 and attaches with the vacuum line 50. The front bearing 26 surrounds the access opening 16. The rear bearing 28 surrounds the opening 40 and supports a rearward extension of the hub 42. The front bearing 26 and the rear bearing 28 cooperate to support and align the evaporation chamber 32 in a desired position along the axis 24. The seal 30 encircles the opening 16 and seals the rotatable evaporation chamber 32 and the enclosure 12 (see also FIG. 2).

The regulator system 61 connects the evaporation chamber and the condensation chamber in fluid communication. The regulator system 61 includes the vacuum line 50, a filter 54 with an intake side and an exhaust side, an intake line 56, an intake valve 66, an intake port 58, a pump 60, an output port 62, an output line 64, a bypass valve 68 and an exhaust line 70. The regulator system 61 attaches with an electronic control system, relevant parts of which are discussed hereinafter.

Figure 3:
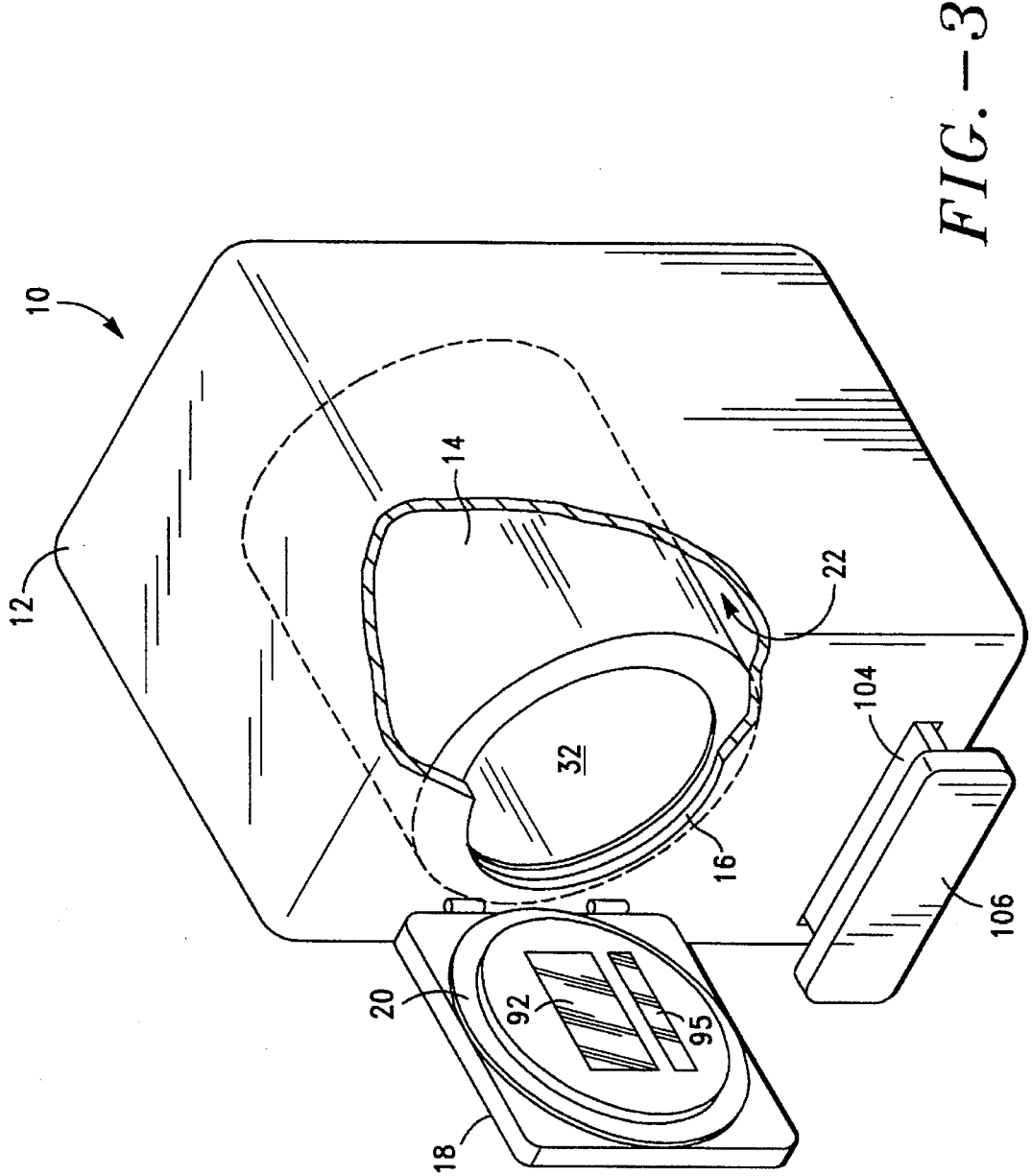
FIG. 3 is a cut away perspective view of the drier illustrated in FIG. 1.

The vacuum line 50 connects at one end to the evaporation chamber. The vacuum line 50 connects at another end to the intake side of the filter 54. An exhaust side of the filter 54 couples through an intake vacuum line 56 to an intake port 58 of the pump 60. The filter 54 filters lint, or other particles, for example. The filter 54 is integral with an assembly 104. The assembly 104 removes from the dryer 10 for cleaning or replacement via a door 106. A seal 108 seals the door 106 with the dryer 10 when the door is closed. FIG. 3 shows a cut-away perspective view of the article drier 10 which illustrates the relationship of the enclosure 12, the evaporation chamber 32, the access opening 16, the assembly 104 and the access door 18.

The intake line 56 connects between the exhaust side of the filter 54, the intake valve 66 and the intake port 58 of the pump 60. The intake valve 66 connects via an intake port 67 to the condensation chamber 22. The intake valve 66 selectively establishes fluid communication between the intake line 56 and the condensation chamber 32. The intake valve 66 attaches electronically with the control system.

The pump 60 includes an output port 62. The output port 62 connects the pump 60 with an output line 64. The pump 60 has a variable pumping rate. The pump 60 is an electrically powered vacuum pump which is selectively activated by the control system.

The bypass valve 68 interconnects the output line 64 and the exhaust line 70. The bypass valve 68 selectively communicates with the condensation chamber 22 through the exit port 69. The bypass valve 68 selectively directs air and moisture from the output line 64 into either the condensation chamber 22 or through the exhaust line 70. The control system electronically regulates the bypass valve 68.

In another preferred embodiment, the bypass valve 68 is replaced with a pair of two-way control valves (not shown). One side of each two-way valve is connected to the pump output line 64. The opposite side of one of the two-way valves connects with the condensation chamber 22. Fluid communication is established between the condensation chamber and the output line when the valve is open. The opposite side of another two-way type valve connects to the exhaust line 70.

The control system selectively activates the intake valve 66 from an open to a closed position. When the intake valve 66 is open, the condensation chamber 22 and the intake vacuum line 56 communicate. During operation of the pump 60, air and moisture are pumped out of the condensation chamber 22 via the intake valve 66 and the intake line 56. The control system electronically connects and regulates the intake valve 66, the bypass valve 68 and the pumping rate of the pump 60. Accordingly, the pressures within the evaporation chamber 32 and the condensation chamber 22 are regulated independently.

The exhaust line 70 includes an outer end 74. The exhaust line 70 passes through an opening 72 formed at the rear of the enclosure 12. The opening 72 permits the exhaust line to exhaust output from the pump 60 to the ambient atmosphere. The outer end 74 of the exhaust line 70 connects to a water vapor trap 76.

The water vapor trap 76 includes baffles 78, an exhaust port 80 and a float valve 82. Moisture in air being pumped out of the article drier 10 condenses on the baffles 78 collects in a reservoir 84 at the bottom of the water vapor trap 76. The air is forced out the exhaust port 80. An air flow sensor 63 mounts on the exhaust port 80 to sense air flow, to sense when air flow ceases and when articles in the evaporation chamber 32 are dry. The air flow sensor connects with the control system. When water collects in the reservoir 84, the float valve 82 opens allowing water to return via a return line 86 to a condensation reservoir 88 located at the bottom of the condensation chamber 22.

In a preferred embodiment, the access door 18 includes an infrared heat source 90, a protective glass 92 and a sensor 94. The infrared heat source 90 is held in the access door 18 and heats articles in the evaporation chamber 32. The protective glass 92 covers the infrared heat source 90. The infrared sensor 94 is held in the access door 18 and connects electronically to the control system. The infrared sensor 94 measures temperature the amount of moisture remaining within the evaporation chamber 32.

In another preferred embodiment, a heater 96 attaches to the enclosure 12 below the condensation reservoir 88. The heater 96 heats the contents of the condensation reservoir 88. The heater 96 is an electric, gas or other type of heater. Preferably, the heater 96 is an electric heater supplied with an electric current via the heater leads 98.

In another preferred embodiment, a liquid level sensor 100 and a liquid pump 102 attach electronically to the control system and attach to the exhaust port 80. The sensor 100 and pump 102 cooperate to purge the condensation reservoir 88 of excess water.

In another preferred embodiment, the drive motor 49, the variable pumping rate of pump 60, and the valves 66 and 68 are controlled by the control system. The control system includes a micro-controller (not shown). The micro-controller, in cooperation with the infrared sensor 94 and a pressure sensor 97 of the sensor system, establishes a control sequence for operating the motor 49, the pump 60 and the valves 66 and 68 to rotate the evaporation chamber 32, to reduce the pressure in both the evaporation chamber 32 and the condensation chamber 22 to begin a drying cycle, and to maintain the reduced pressure for continuing the drying cycle.

Figure 4:
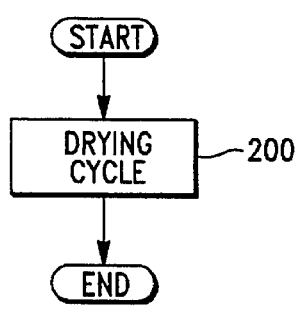
FIG. 4–8 are flow diagrams illustrating control sequences for the article drier according to the present invention.
Figure 5:
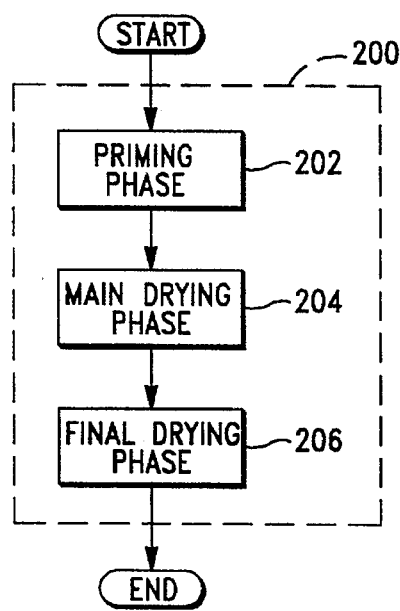
Figure 6:
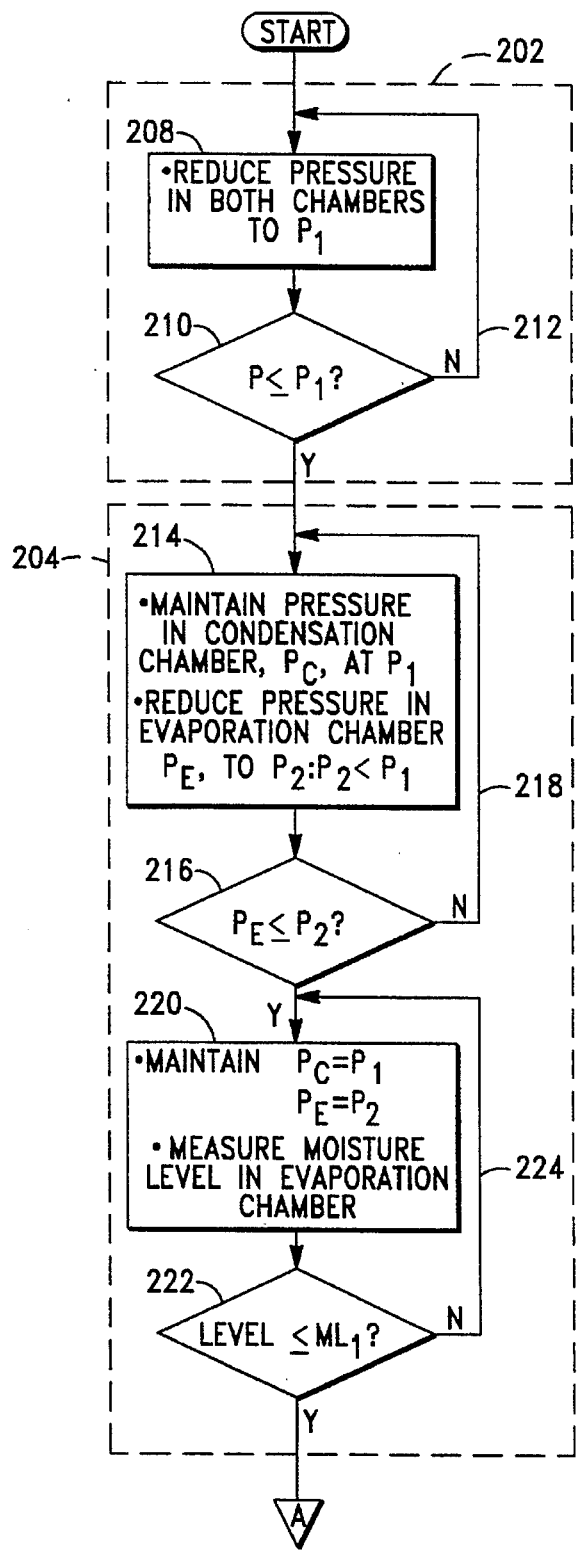
Figure 7:
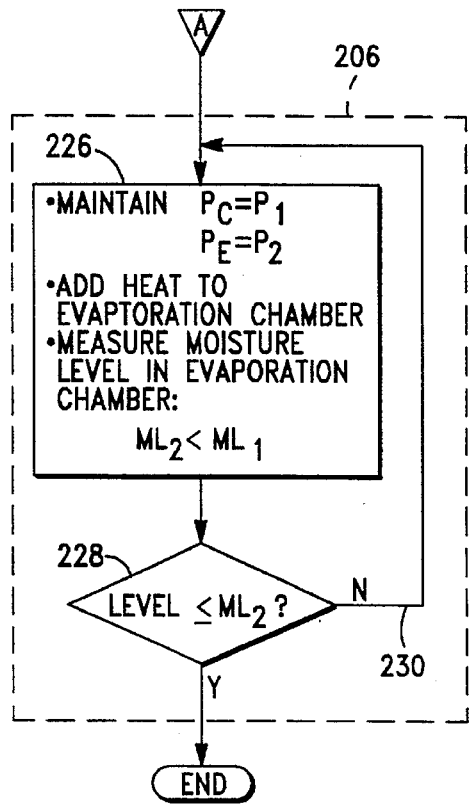
Figure 8:
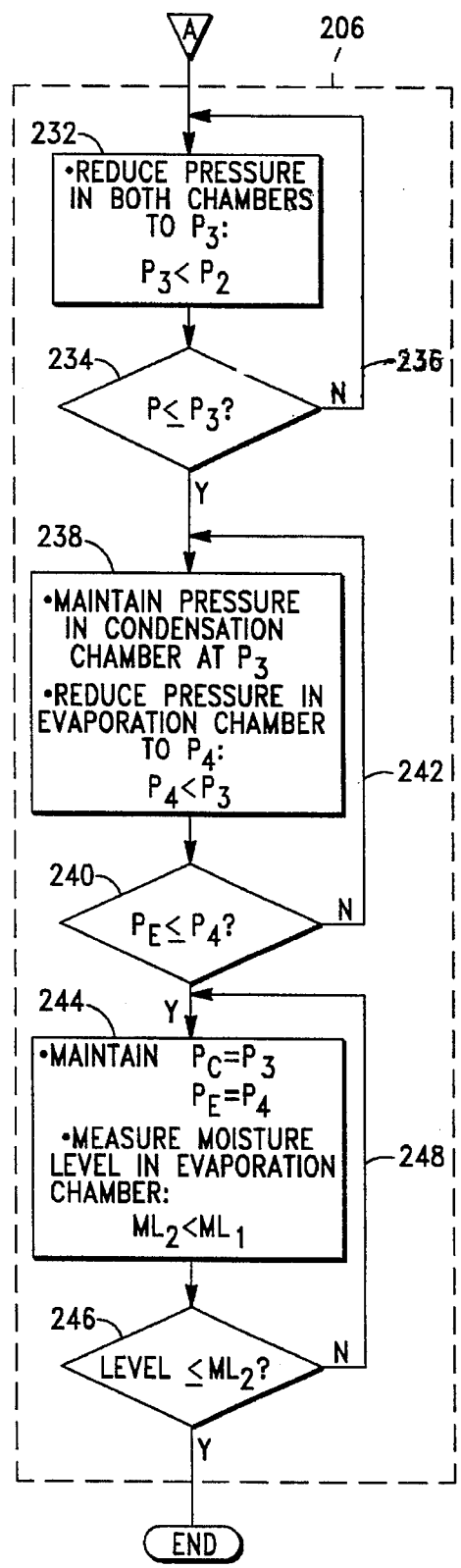

The control sequence is illustrated in FIGS. 4–8 which present flow diagrams of control sequence steps. FIG. 4 illustrates a single process step, a drying cycle 200. FIG. 5 illustrates the drying cycle 200 including three primary phases of operation, a priming phase 202, a main drying phase 204, and a final drying phase 206. FIG. 6 illustrates in more detail the control sequence steps of the priming phase 202 and the main drying phase 204. FIG. 7 shows detailed control sequence steps for one embodiment of the final drying phase 206, while FIG. 8 shows detailed control sequence steps for a second embodiment of the final drying phase 206.

In a preferred embodiment, the evaporation chamber rotates throughout the drying cycle 200 to maximize contact of the articles to be dried with the inner surface 34 of the evaporation chamber.

The initial portion of the drying cycle 200 is the priming phase 202, during which the pressure in both the evaporation chamber 32 and the condensation chamber 22 is reduced to a level such that evaporation of the moisture from the articles to be dried will begin. This process is illustrated in FIG. 6 by control sequence steps 208 and 210.

To accomplish this pressure reduction, the pump 60 is operated and the intake valve 66 is opened to reduce the pressure equally in both chambers. The bypass valve 68 is controlled to exhaust the pump output to the water vapor trap 76, and to a region outside both sealed chambers. A pressure sensor 99 senses pressure within the condensation chamber 22. The pressure sensor 99 is fixed on the inner surface of the condensation chamber 22 and communicates with the control system. The priming phase 202 will terminate when the pressure in the condensation chamber 22 reaches a predetermined target value, indicated as pressure $P_1$ in the process steps 208 and 210 of FIG. 6. In one embodiment, the value $P_1$ is approximately 5 psia, a pressure at which evaporation will begin.

The termination of the priming phase 202 initiates the main drying phase 204. During the main drying phase 204 a significant amount of moisture evaporates from the articles to be dried. During the main drying phase 204, the pump 60 continues to operate, and the intake valve 66 and the bypass valve 68 are controlled to maintain the pressure in the condensation chamber 22, $P_C$, at the predetermined level $P_1$. The pressure within the evaporation chamber 32, $P_E$, will stabilize at a pressure, $P_2$, lower than the predetermined level $P_1$.

To achieve this pressure differential between the sealed chambers, the intake valve 66 closes as the main drying phase 204 begins so that no additional air and moisture pumps out of the condensation chamber 22. The bypass valve 68 diverts the pump output into the condensation chamber 22 through the bypass valve port 69. The result is that a pressure difference is created between the evaporation chamber 32, and the condensation chamber 22. In a preferred embodiment, a stabilized pressure of about 3 psia is achieved within the evaporation chamber 32. These control sequence steps are reflected in steps 214 and 216 of FIG. 6.

The stabilized pressure within the evaporation chamber 32, $P_E$, is lower than the stabilized pressure within the condensation chamber 22, $P_C$, because air and moisture are being pumped out of the evaporation chamber 32 and into the condensation chamber 22. As air passes from the evaporation chamber 32 past the pump 60 to the condensation chamber, the pressure of vapor removed from the evaporation chamber 32 increases and causes condensation.

When the pressure in the condensation chamber 22 begins to deviate from the predetermined level, the pumping rate of the pump 60 is controlled to bring the pressure back within operating limits. In this manner the pressure differential between the two chambers is maintained within the operating limits during the main drying phase 204.

When the vapor pressure inside the evaporation chamber 32 is at 3 psia, the boiling point of water is 141° F. At the 5 psia pressure within the condensation chamber, the temperature of the vapor within the condensation chamber is 162° F. In the condensation chamber 22, vapor condenses on the outer surface 36 of the evaporation chamber 32. This condensation warms the evaporation chamber 32. Accordingly, heat transfers from the vapor through the outer surface 36 to the inner surface 34 of the evaporation chamber 32. A temperature difference of 21° F.,21° for example, between the outer surface 36 and the inner surface 34 insures that heat continuously transfers through the evaporation chamber walls and is available to promote evaporation of moisture from the articles to be dried which come into contact with the inner surface 34 of the evaporation chamber 32.

As the main drying phase 204 continues, the amount of moisture remaining in the articles is reduced to a predetermined moisture level $ML_1$. The infrared sensor 94, located in the access door 18, is used to measure the level of the moisture within the evaporation chamber 32. When the level of moisture within the evaporation chamber 32 drops to the predetermined limit, $ML_1$, the main drying phase 204 terminates and the final drying phase 206 begins. This portion of the control sequence includes control sequence steps 220 and 222 of FIG. 6.

In one embodiment of the invention, as illustrated by the control sequence steps 226 and 228 of FIG. 7, the existing pressures are maintained in the two chambers during the final drying phase 206. This result is achieved, as before, by control of the valves 66, 68, and the pumping rate of the pump 60. The infrared source 90, located in the access door 18, is operated to add additional heat to the articles in the evaporation chamber 32 to replace the heat no longer supplied in sufficient quantity through the walls of the evaporation chamber 32 by condensation. This process continues until the level of moisture in the evaporation chamber 32 falls to a second predetermined level, $ML_2$. At that point in the control sequence, step 228, the drying cycle 200 is complete. The evaporation chamber rotation is stopped, the pumping is ceased, and the bypass valve 68 is operated to allow the pressure within both chambers to return to atmospheric pressure so that the access door 18 can be opened for removing the dried articles.

In another embodiment of the invention, as illustrated by the control sequence steps 232–246 of FIG. 8, the pressures within the two chambers are further reduced as the final drying phase 206 is begun. The pressure in the condensation chamber 22 is reduced to about 2 psia, while the pressure in the evaporation chamber 32 is reduced to about 0.5 psia. At 2 psia, the temperature within the condensation chamber 22 is approximately 126° F. The boiling point of water in the evaporation chamber is lowered to about 80° F. The temperature difference available to transfer heat through the evaporation chamber walls is about 46° F. This new pressure equilibrium allows the articles to be dried at a much cooler temperature, and compensates for the loss of moisture available for condensation. Additional heat is supplied as needed through the use of the infrared source 90 located in the access door 18.

A key factor to understanding the efficient operation of the present invention is that it is demonstrably more efficient to recover the heat of condensation in the manner described above than it is to add heat to the system using some form of external energy such as electricity or the burning of a fossil fuel such as natural gas. This efficiency is illustrated by the following example. Given:

| | |
|---|---|
| effective vapor pumping power: | 1 Kw = 1.34 hp ((550 ft lbf/sec)/hp) = 737.0 ft lpf/sec |
| vapor pressure: | 3 psia |
| vapor temperature: | 141.47° F. |
| exit pressure: | 5 psia |
| condensation temperature: | 162.24° F. |
| delta T: | 20.77° F. |
| specific volume of vapor: | 118.73 ft³/lbm |
| Calculate energy required to move 1 lb of vapor from 3 psia to 5 psia: | |
| E/lb = | (118.73 ft³/lb_vapor)((5–3)psia) |
| | (118.73 ft³/lb_vapor)(2 lbf/in²)(144 in²/ft²) |
| | (118.73 * 2 * 144) ft lbf/lb_vapor |
| | 34,194 ft lbf/lb_vapor |
| Calculate vapor transfer rate: | |
| VTR = | (737 ft lbf/sec)/(34,194 lbf/lb_vapor) |
| | 0.00216 lb_vapor/sec |
| | 77.76 lb_vapor/hr |
| Calculate Coefficient of Performance: | |
| COP = | ((1077.6 – 180.12 Btu)/lb_vapor)/(34,194 ft lbf/lb_vapor) |
| | 897.48 Btu (778.16 ft lbf/Btu)/34194 ft lbf |
| | 20.42, | thus illustrating a more than an order of magnitude improvement in efficiency of the present invention over drying by electric or fossil fuel heat sources.

While the foregoing detailed description has described several embodiments of the article drier in accordance with this invention, it is to be understood that the above description is illustrative only and not limiting of the disclosed invention. Particularly, the specific physical embodiments of the evaporation and condensation chambers may vary from those illustrated so long as a substantial portion of the evaporation chamber is enclosed by the condensation chamber, and there remains a thermal communication between the two chambers. Also, the manner in which the pressures within the chambers is established and maintained, and the manner in which the phases of the drying cycle are controlled may differ from those described. It will be appreciated that variations in the elements for adding heat to the system may vary from those disclosed and remain within the scope and spirit of this invention. Thus the invention is to be limited only by the claims as set forth below.

We claim:

1. A system for drying articles comprising:

an evaporation chamber having an interior and an exterior, the interior being pressure sealed;

a condensation chamber and a vacuum line, the condensation chamber being pressure sealed, the vacuum line connecting the condensation chamber in fluid communication with the evaporation chamber;

a pump attached in fluid communication with the vacuum line, the pump regulating pressure in the evaporation chamber and in the condensation chamber respectively, wherein the pump draws vapor from the evaporation chamber into the condensation chamber, the vapor condenses in the condensation chamber and heat conducts from the condensation chamber to the evaporation chamber;

an exhaust line and a vapor trap, the exhaust line being connected between the pump and the vapor trap, the vapor trap having baffles, an exhaust port and a float valve, wherein moisture from the exhaust line condenses on the baffles, the condensed moisture from the exhausted air collects in a condensation reservoir, and the float valve regulates the collection of the condensed moisture in the condensation reservoir.

2. A heat recapturing dryer for drying articles comprising:

an evaporation chamber having an interior and an exterior, the interior being pressure sealed;

a condensation chamber, the condensation chamber being pressure sealed, the condensation chamber being connected in fluid communication with the evaporation chamber, the condensation chamber being connected in thermal communication with the exterior of the evaporation chamber;

a regulator system being attached in fluid communication with the evaporation chamber and the condensation chamber to independently regulate pressure in the evaporation chamber and the condensation chamber respectively;

a heater attached to the dryer, the heater communicating with the evaporation chamber for adding heat to the evaporation chamber, wherein pressure in the condensation chamber and pressure in the evaporation chamber are regulated to draw vapor from the evaporation chamber into the condensation chamber, the vapor condensing in the condensation chamber and transferring heat from the condensation chamber to the evaporation chamber; and the heater being connected with the condensation chamber to heat vapor in the condensation chamber, the vapor contacting the exterior of the evaporation chamber and transferring heat to the evaporation chamber.

3. A device as set forth in claim 2 wherein the heater is a gas burner which transfers heat to the condensation chamber.

4. A device as set forth in claim 2 wherein the heater is electrically powered.

5. A heat recapturing dryer for drying articles comprising:

an evaporation chamber having an interior and an exterior, the interior being pressure sealed;

a condensation chamber, the condensation chamber being pressure sealed, the condensation chamber being connected in fluid communication with the evaporation chamber, the condensation chamber being connected in thermal communication with the exterior of the evaporation chamber;

a regulator system being attached in fluid communication with the evaporation chamber and the condensation chamber for independently regulating pressure in the evaporation chamber and the condensation chamber respectively, wherein pressure in the condensation chamber and pressure in the evaporation chamber are regulated for drawing vapor from the evaporation chamber to the condensation chamber, the vapor condensing in the condensation chamber and transferring heat from the condensation chamber to the evaporation chamber;

a heater attached to the dryer, the heater being in thermal communication with the evaporation chamber for adding heat to the evaporation chamber; and the dryer including an exhaust port and an air flow sensor, the air flow sensor being attached to the exhaust port for sensing when air has been effectively purged from both the evaporation chamber and the condensation chamber.

6. A heat recapturing dryer for drying clothing comprising:

an evaporation chamber having a cylindrical shape, an access opening, an interior and an exterior, the interior being pressure sealed;

a door mounted on the evaporation chamber, the door opening and closing, the door forming a pressure seal with the evaporation chamber when closed;

a condensation chamber surrounding the evaporation chamber, the condensation chamber being pressure sealed and connecting in fluid communication with the evaporation chamber, the exterior of the evaporation chamber forming a portion of the condensation chamber for conducting heat from the condensation chamber to the evaporation chamber; and a pump being attached in fluid communication between the evaporation chamber and the condensation chamber for drawing vapor from the evaporation chamber and forcing the vapor into the condensation chamber where the vapor condenses on the exterior surface of the evaporation chamber, the pump being operated to reduce pressure in the condensation chamber to within a range defined between atmospheric pressure and 2 psia.

7. A heat recapturing dryer for drying clothing comprising:

an evaporation chamber having a cylindrical shape, an access opening, an interior and an exterior, the interior being pressure sealed;

a door being mounted on the evaporation chamber and adapted for opening and closing, and forming a pressure seal with the evaporation chamber when closed;

a condensation chamber surrounding the evaporation chamber, the condensation chamber being pressure sealed and connecting in fluid communication with the evaporation chamber, the exterior of the evaporation chamber forming a portion of the condensation chamber for conducting heat from the condensation chamber to the evaporation chamber; and a pump being attached in fluid communication between the evaporation chamber and the condensation chamber for drawing vapor from the evaporation chamber and forcing the vapor into the condensation chamber where the vapor condenses on the exterior surface of the evaporation chamber, the evaporation chamber including a closed back having an opening, a hub, a collar, a front bearing and a rear bearing, the hub being attached to the closed back, the hub engaging the rear bearing, the hub including a hollow central portion and multiple exhaust ports, the exhaust ports extending radially from the hollow central portion through the hub, the collar coupling the exhaust ports with the vacuum line, wherein when the evaporation chamber rotates, the exhaust ports alternately couple with the vacuum line.

8. A device as set forth in claim 7 wherein the front bearing surrounds the access opening, the rear bearing supports a rearward extension of the hub, wherein the front bearing and the rear bearing cooperate to support and align the evaporation chamber in a desired position.

9. A device as recited in claim 8 further comprising a pulley, a drive belt, a small drive pulley and a motor, wherein the pulley attaches with the hub and with the closed back of the evaporation chamber, the pulley engages the drive belt, the drive belt couples with a small drive pulley, and the motor attaches to rotate the small drive pulley to rotate the evaporation chamber when the motor is on.

* * * * *